United States Patent
Friedlander et al.

(10) Patent No.: US 9,202,184 B2
(45) Date of Patent: Dec. 1, 2015

(54) OPTIMIZING THE SELECTION, VERIFICATION, AND DEPLOYMENT OF EXPERT RESOURCES IN A TIME OF CHAOS

(75) Inventors: Robert R. Friedlander, Southbury, CT (US); Richard A. Hennessy, Austin, TX (US); Anwer Mujahid Khan, New York, NY (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 2918 days.

(21) Appl. No.: 11/516,953

(22) Filed: Sep. 7, 2006

(65) Prior Publication Data

US 2008/0077463 A1  Mar. 27, 2008

(51) Int. Cl.
*G06Q 10/00* (2012.01)
*G06Q 30/00* (2012.01)
*G06Q 10/06* (2012.01)

(52) U.S. Cl.
CPC ........ *G06Q 10/06* (2013.01); *G06Q 10/063112* (2013.01)

(58) Field of Classification Search
CPC ................... G06Q 10/06; G06Q 10/063112
USPC .............................. 705/7.12, 7.13
See application file for complete search history.

(56) References Cited

U.S. PATENT DOCUMENTS

| | | |
|---|---|---|
| 4,328,978 A | 5/1982 | McLaughlin |
| 4,551,842 A | 11/1985 | Segarra |
| 4,841,526 A | 6/1989 | Wilson et al. |
| 4,890,227 A | 12/1989 | Watanabe et al. |
| 5,070,453 A | 12/1991 | Duffany |
| 5,128,871 A | 7/1992 | Schmitz |
| 5,212,788 A | 5/1993 | Lomet et al. |
| 5,216,134 A | 6/1993 | Mukkala et al. |

(Continued)

FOREIGN PATENT DOCUMENTS

| | | |
|---|---|---|
| EP | 0772367 | 5/1997 |
| EP | 0959635 | 11/1999 |

(Continued)

OTHER PUBLICATIONS

Hayes et al., "Picking Up the Pieces: Utilizing Disaster Recovery Project Management to Improve Readiness and Response Time", IEEE Industry Applications Magazine, Nov./Dec. 2002, pp. 1-10.

(Continued)

*Primary Examiner* — Stephanie Delich
(74) *Attorney, Agent, or Firm* — Yee & Associates, P.C.; Maeve McCarthy

(57) ABSTRACT

A computer implemented method, apparatus, and computer usable program code for finding skills and resources for a chaotic event. Skills data for the chaotic event are organized. A determination is made whether the skills and the resources are available in response to a receiving an identification of the skills and the resources that are required to manage the chaotic event. The skills and the resources are optimized based on requirements and constraints, potential skills, and enabling resources to determine optimized skills and optimized resources. The availability of the optimized skills and the optimized resources are verified. The optimized skills and the optimized resources are reoptimized in response to a determination that the optimized skills and the optimized resources are unavailable.

3 Claims, 6 Drawing Sheets

(56) References Cited

U.S. PATENT DOCUMENTS

| | | |
|---|---|---|
| 5,237,429 A | 8/1993 | Zuiss et al. |
| 5,321,207 A | 6/1994 | Huang |
| 5,406,626 A | 4/1995 | Ryan |
| 5,455,868 A | 10/1995 | Sergent et al. |
| 5,491,838 A | 2/1996 | Takahisa |
| 5,517,642 A | 5/1996 | Bezek et al. |
| 5,524,051 A | 6/1996 | Ryan |
| 5,546,580 A | 8/1996 | Seliger et al. |
| 5,550,021 A | 8/1996 | Blum et al. |
| 5,577,266 A | 11/1996 | Takahisa et al. |
| 5,590,195 A | 12/1996 | Ryan |
| 5,613,194 A | 3/1997 | Olds et al. |
| 5,642,397 A | 6/1997 | Agbaje-Anozie |
| 5,659,596 A | 8/1997 | Dunn |
| 5,692,446 A | 12/1997 | Becker et al. |
| 5,692,501 A | 12/1997 | Minturn |
| 5,696,964 A | 12/1997 | Cox et al. |
| 5,745,532 A | 4/1998 | Campana, Jr. |
| 5,751,806 A | 5/1998 | Ryan |
| 5,764,740 A | 6/1998 | Holender |
| 5,781,704 A | 7/1998 | Rossmo |
| 5,809,472 A | 9/1998 | Morrison |
| 5,815,971 A | 10/1998 | Rothe et al. |
| 5,825,755 A | 10/1998 | Thompson et al. |
| 5,838,918 A | 11/1998 | Prager et al. |
| 5,880,598 A | 3/1999 | Duong |
| 5,889,474 A | 3/1999 | LaDue |
| 5,926,624 A | 7/1999 | Katz et al. |
| 5,930,350 A | 7/1999 | Johnson |
| 5,965,352 A | 10/1999 | Stoughton et al. |
| 5,974,312 A | 10/1999 | Hayes, Jr. et al. |
| 5,982,281 A | 11/1999 | Layson, Jr. |
| 5,993,386 A | 11/1999 | Ericsson |
| 6,021,403 A | 2/2000 | Horvitz et al. |
| 6,058,391 A | 5/2000 | Gardner |
| 6,076,166 A | 6/2000 | Moshfeghi et al. |
| 6,167,405 A | 12/2000 | Rosensteel, Jr. et al. |
| 6,189,004 B1 | 2/2001 | Rassen et al. |
| 6,192,340 B1 | 2/2001 | Abecassis |
| 6,212,524 B1 | 4/2001 | Weissman et al. |
| 6,216,134 B1 | 4/2001 | Heckerman et al. |
| 6,226,408 B1 | 5/2001 | Sirosh |
| 6,260,036 B1 | 7/2001 | Almasi et al. |
| 6,269,365 B1 | 7/2001 | Kiyoki et al. |
| 6,278,999 B1 | 8/2001 | Knapp |
| 6,285,866 B1 | 9/2001 | Lee et al. |
| 6,285,886 B1 | 9/2001 | Kamel et al. |
| 6,321,207 B1 | 11/2001 | Ye |
| 6,353,818 B1 | 3/2002 | Carino, Jr. |
| 6,370,931 B2 | 4/2002 | Bennett |
| 6,377,993 B1 | 4/2002 | Brandt et al. |
| 6,385,604 B1 | 5/2002 | Bakalash et al. |
| 6,470,298 B1 | 10/2002 | Banks et al. |
| 6,484,144 B2 | 11/2002 | Martin et al. |
| 6,484,155 B1 | 11/2002 | Kiss et al. |
| 6,506,384 B1 | 1/2003 | Laal et al. |
| 6,509,898 B2 | 1/2003 | Chi et al. |
| 6,563,804 B1 | 5/2003 | Iyer et al. |
| 6,578,043 B2 | 6/2003 | Nye |
| 6,581,037 B1 | 6/2003 | Pak |
| 6,606,625 B1 | 8/2003 | Muslea et al. |
| 6,611,822 B1 | 8/2003 | Beams et al. |
| 6,611,846 B1 | 8/2003 | Stoodley |
| 6,629,106 B1 | 9/2003 | Narayanaswamy et al. |
| 6,662,141 B2 | 12/2003 | Kaub |
| 6,675,159 B1 | 1/2004 | Lin et al. |
| 6,714,979 B1 | 3/2004 | Brandt et al. |
| 6,757,646 B2 | 6/2004 | Marchisio |
| 6,823,818 B2 | 11/2004 | van den Berg et al. |
| 6,826,568 B2 | 11/2004 | Bernstein et al. |
| 6,829,604 B1 | 12/2004 | Tifft |
| 6,834,274 B2 | 12/2004 | Tafoya |
| 6,905,816 B2 | 6/2005 | Jacobs et al. |
| 6,937,147 B2 * | 8/2005 | Dilbeck et al. ............... 340/506 |
| 6,941,311 B2 | 9/2005 | Shah et al. |
| 6,954,736 B2 | 10/2005 | Menninger et al. |
| 6,963,826 B2 | 11/2005 | Hanaman et al. |
| 6,965,816 B2 | 11/2005 | Walker |
| 6,972,687 B1 | 12/2005 | Marshall et al. |
| 6,978,268 B2 | 12/2005 | Thomas et al. |
| 6,996,567 B2 | 2/2006 | Ghukasyan |
| 7,019,740 B2 | 3/2006 | Georgalas |
| 7,047,253 B1 | 5/2006 | Murthy et al. |
| 7,072,794 B2 | 7/2006 | Wittkowski |
| 7,076,437 B1 | 7/2006 | Levy |
| 7,080,081 B2 | 7/2006 | Agarwal et al. |
| 7,089,250 B2 | 8/2006 | Doganata et al. |
| 7,111,010 B2 | 9/2006 | Chen |
| 7,139,675 B2 | 11/2006 | Banks et al. |
| 7,143,091 B2 | 11/2006 | Charnock et al. |
| 7,152,070 B1 | 12/2006 | Musick et al. |
| 7,179,645 B2 | 2/2007 | Humphreys et al. |
| 7,181,428 B2 | 2/2007 | Lawrence |
| 7,213,009 B2 | 5/2007 | Pestotnik et al. |
| 7,230,930 B2 | 6/2007 | Ahya et al. |
| 7,240,330 B2 | 7/2007 | Fairweather |
| 7,295,925 B2 | 11/2007 | Breed et al. |
| 7,337,146 B2 | 2/2008 | Heelan et al. |
| 7,346,492 B2 | 3/2008 | Shaw |
| 7,356,416 B2 | 4/2008 | Busa |
| 7,389,245 B1 | 6/2008 | Ashford et al. |
| 7,389,281 B2 | 6/2008 | Strobel Stewart et al. |
| 7,403,922 B1 | 7/2008 | Lewis et al. |
| 7,426,441 B2 | 9/2008 | Mendrick et al. |
| 7,428,554 B1 | 9/2008 | Coberley et al. |
| 7,433,853 B2 | 10/2008 | Brockway et al. |
| 7,457,731 B2 | 11/2008 | Rao |
| 7,457,810 B2 | 11/2008 | Breining et al. |
| 7,500,150 B2 | 3/2009 | Sharma et al. |
| 7,516,142 B2 | 4/2009 | Friedlander et al. |
| 7,523,118 B2 | 4/2009 | Friedlander et al. |
| 7,526,467 B2 | 4/2009 | Fogel |
| 7,529,685 B2 | 5/2009 | Davies et al. |
| 7,533,113 B1 | 5/2009 | Haddad |
| 7,543,149 B2 | 6/2009 | Ricciardi et al. |
| 7,580,922 B2 | 8/2009 | Friedlander et al. |
| 7,584,160 B2 | 9/2009 | Friedlander et al. |
| 7,606,772 B2 | 10/2009 | Flinn et al. |
| 7,630,330 B2 | 12/2009 | Gatts |
| 7,630,948 B2 | 12/2009 | Friedlander et al. |
| 7,630,986 B1 | 12/2009 | Herz et al. |
| 7,631,222 B2 | 12/2009 | Hasan et al. |
| 7,644,013 B2 | 1/2010 | Nastacio et al. |
| 7,644,056 B2 | 1/2010 | Khalsa |
| 7,647,286 B2 | 1/2010 | Friedlander et al. |
| 7,647,288 B2 | 1/2010 | Friedlander et al. |
| 7,653,609 B2 | 1/2010 | Friedlander et al. |
| 7,676,390 B2 | 3/2010 | Senturk et al. |
| 7,680,340 B2 | 3/2010 | Luo et al. |
| 7,685,083 B2 | 3/2010 | Fairweather |
| 7,693,766 B2 | 4/2010 | Horowitz |
| 7,698,246 B2 | 4/2010 | Friedlander et al. |
| 7,702,605 B2 | 4/2010 | Friedlander et al. |
| 7,720,891 B2 | 5/2010 | Luchangco et al. |
| 7,725,339 B1 * | 5/2010 | Aykin ............................. 705/7 |
| 7,739,223 B2 | 6/2010 | Vaschillo et al. |
| 7,752,154 B2 | 7/2010 | Friedlander et al. |
| 7,756,723 B2 | 7/2010 | Rosow et al. |
| 7,756,724 B2 | 7/2010 | Gropper et al. |
| 7,756,728 B2 | 7/2010 | Maughan et al. |
| 7,761,440 B2 | 7/2010 | Chow et al. |
| 7,779,051 B2 | 8/2010 | Friedlander et al. |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,788,208 B2 | 8/2010 | Kobayashi et al. |
| 7,792,773 B2 | 9/2010 | McCord et al. |
| 7,792,774 B2 | 9/2010 | Friedlander et al. |
| 7,792,776 B2 | 9/2010 | Friedlander et al. |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,822,747 B2 | 10/2010 | Clark et al. |
| 7,853,611 B2 | 12/2010 | Friedlander et al. |

(56) References Cited

U.S. PATENT DOCUMENTS

| | | |
|---|---|---|
| 7,865,534 B2 | 1/2011 | Chandra et al. |
| 7,885,915 B2 | 2/2011 | Parson et al. |
| 7,890,200 B2 | 2/2011 | Al-Attar et al. |
| 7,917,374 B2 | 3/2011 | Walker |
| 7,917,478 B2 | 3/2011 | Friedlander et al. |
| 7,917,525 B2 | 3/2011 | Rawlings et al. |
| 7,930,262 B2 | 4/2011 | Friedlander et al. |
| 7,969,879 B2 | 6/2011 | Purpura |
| 7,970,759 B2 | 6/2011 | Friedlander et al. |
| 7,992,776 B1 | 8/2011 | Ramachandran et al. |
| 8,000,978 B2 | 8/2011 | Wager et al. |
| 8,010,400 B2 | 8/2011 | Mascarenhas |
| 8,036,931 B2 | 10/2011 | Hale et al. |
| 8,055,603 B2 | 11/2011 | Angell et al. |
| 8,068,989 B2 | 11/2011 | Jung et al. |
| 8,131,472 B2 | 3/2012 | Friedlander et al. |
| 8,135,740 B2 | 3/2012 | Friedlander et al. |
| 8,140,363 B2 | 3/2012 | Hodgin |
| 8,145,582 B2 | 3/2012 | Angell et al. |
| 8,171,022 B2 | 5/2012 | Johnston |
| 8,200,501 B2 | 6/2012 | Friedlander et al. |
| 8,346,802 B2 | 1/2013 | Friedlander et al. |
| 2001/0051881 A1 | 12/2001 | Filler |
| 2002/0002559 A1 | 1/2002 | Busa |
| 2002/0004725 A1 | 1/2002 | Martin et al. |
| 2002/0004782 A1 | 1/2002 | Cincotta |
| 2002/0049772 A1 | 4/2002 | Rienhoff, Jr. et al. |
| 2002/0052756 A1 | 5/2002 | Lomangino |
| 2002/0059183 A1 | 5/2002 | Chen |
| 2002/0082806 A1 | 6/2002 | Kaub |
| 2002/0099691 A1 | 7/2002 | Lore et al. |
| 2002/0099692 A1 | 7/2002 | Shah et al. |
| 2002/0107824 A1 | 8/2002 | Ahmed |
| 2002/0111826 A1 | 8/2002 | Potter et al. |
| 2002/0111922 A1 | 8/2002 | Young et al. |
| 2002/0121244 A1 | 9/2002 | van den Berg et al. |
| 2002/0150957 A1 | 10/2002 | Slotman |
| 2002/0156763 A1 | 10/2002 | Marchisio |
| 2002/0156791 A1 | 10/2002 | Nesamoney et al. |
| 2002/0178077 A1* | 11/2002 | Katz et al. ............... 705/26 |
| 2002/0184225 A1 | 12/2002 | Ghukasyan |
| 2002/0184401 A1 | 12/2002 | Kadel, Jr. et al. |
| 2003/0014400 A1 | 1/2003 | Siegel |
| 2003/0018633 A1 | 1/2003 | Horn |
| 2003/0033263 A1 | 2/2003 | Cleary |
| 2003/0037063 A1 | 2/2003 | Schwartz |
| 2003/0074222 A1 | 4/2003 | Rosow et al. |
| 2003/0088365 A1 | 5/2003 | Becker |
| 2003/0088438 A1 | 5/2003 | Maughan et al. |
| 2003/0093187 A1 | 5/2003 | Walker |
| 2003/0120651 A1 | 6/2003 | Bernstein et al. |
| 2003/0125998 A1* | 7/2003 | McKenney et al. ............ 705/7 |
| 2003/0126148 A1 | 7/2003 | Gropper et al. |
| 2003/0140063 A1 | 7/2003 | Pizzorno et al. |
| 2003/0171876 A1 | 9/2003 | Markowitz et al. |
| 2003/0177038 A1 | 9/2003 | Rao |
| 2003/0182281 A1 | 9/2003 | Wittkowski |
| 2003/0182310 A1 | 9/2003 | Charnock et al. |
| 2003/0191699 A1 | 10/2003 | Deveauet al. |
| 2003/0195898 A1 | 10/2003 | Agarwal et al. |
| 2003/0200531 A1 | 10/2003 | Fairweather |
| 2003/0212546 A1 | 11/2003 | Shaw |
| 2003/0212664 A1 | 11/2003 | Breining et al. |
| 2004/0006532 A1 | 1/2004 | Lawrence et al. |
| 2004/0006694 A1 | 1/2004 | Heelan et al. |
| 2004/0054144 A1 | 3/2004 | Itai |
| 2004/0083195 A1* | 4/2004 | McCord et al. ............ 706/47 |
| 2004/0122787 A1 | 6/2004 | Avinash et al. |
| 2004/0193572 A1 | 9/2004 | Leary |
| 2004/0215981 A1 | 10/2004 | Ricciardi et al. |
| 2004/0249678 A1 | 12/2004 | Henderson |
| 2004/0249679 A1 | 12/2004 | Henderson et al. |
| 2004/0249796 A1 | 12/2004 | Azzam |
| 2005/0004823 A1 | 1/2005 | Hnatio |
| 2005/0038608 A1 | 2/2005 | Chandra et al. |
| 2005/0049988 A1 | 3/2005 | Dahlquist et al. |
| 2005/0050030 A1 | 3/2005 | Gudbjartsson et al. |
| 2005/0050068 A1 | 3/2005 | Vaschillo et al. |
| 2005/0055257 A1 | 3/2005 | Senturk et al. |
| 2005/0075904 A1 | 4/2005 | Wager et al. |
| 2005/0075995 A1 | 4/2005 | Stewart et al. |
| 2005/0080806 A1 | 4/2005 | Doganata et al. |
| 2005/0102210 A1 | 5/2005 | Song et al. |
| 2005/0105775 A1 | 5/2005 | Luo et al. |
| 2005/0125274 A1* | 6/2005 | Nastacio et al. ............... 705/8 |
| 2005/0144062 A1 | 6/2005 | Mittal et al. |
| 2005/0149466 A1 | 7/2005 | Hale et al. |
| 2005/0165594 A1 | 7/2005 | Chandra et al. |
| 2005/0246189 A1 | 11/2005 | Monitzer et al. |
| 2005/0287890 A1 | 12/2005 | Herrmann et al. |
| 2006/0010090 A1 | 1/2006 | Brockway et al. |
| 2006/0036560 A1 | 2/2006 | Fogel |
| 2006/0036619 A1 | 2/2006 | Fuerst et al. |
| 2006/0041659 A1 | 2/2006 | Hasan et al. |
| 2006/0056320 A1 | 3/2006 | Gatts |
| 2006/0069514 A1 | 3/2006 | Chow et al. |
| 2006/0070127 A1 | 3/2006 | Friedlander et al. |
| 2006/0149705 A1 | 7/2006 | Friedlander et al. |
| 2006/0155627 A1 | 7/2006 | Horowitz |
| 2006/0184483 A1 | 8/2006 | Clark et al. |
| 2006/0200435 A1 | 9/2006 | Flinn et al. |
| 2006/0218010 A1 | 9/2006 | Michon et al. |
| 2006/0241981 A1 | 10/2006 | Walker |
| 2006/0253418 A1 | 11/2006 | Charnock et al. |
| 2006/0282222 A1 | 12/2006 | Mitsuyama et al. |
| 2006/0287890 A1 | 12/2006 | Stead et al. |
| 2007/0005646 A1 | 1/2007 | Dumais et al. |
| 2007/0027674 A1 | 2/2007 | Parson et al. |
| 2007/0033084 A1 | 2/2007 | Mascarenhas |
| 2007/0033095 A1* | 2/2007 | Hodgin ............... 705/10 |
| 2007/0073654 A1 | 3/2007 | Chow et al. |
| 2007/0073754 A1 | 3/2007 | Friedlander et al. |
| 2007/0106478 A1 | 5/2007 | Jung et al. |
| 2007/0106754 A1 | 5/2007 | Moore |
| 2007/0112714 A1 | 5/2007 | Fairweather |
| 2007/0136429 A1 | 6/2007 | Fine et al. |
| 2007/0174090 A1 | 7/2007 | Friedlander et al. |
| 2007/0174091 A1 | 7/2007 | Friedlander et al. |
| 2007/0174252 A1 | 7/2007 | Rawlings et al. |
| 2007/0174840 A1 | 7/2007 | Sharma et al. |
| 2007/0185586 A1 | 8/2007 | Al-Attar et al. |
| 2007/0185737 A1 | 8/2007 | Friedlander et al. |
| 2007/0192065 A1* | 8/2007 | Riggs et al. ............... 702/189 |
| 2007/0198450 A1 | 8/2007 | Khalsa |
| 2007/0198518 A1 | 8/2007 | Luchangco et al. |
| 2007/0203872 A1 | 8/2007 | Flinn et al. |
| 2007/0233631 A1 | 10/2007 | Kobayashi et al. |
| 2007/0233730 A1 | 10/2007 | Johnston |
| 2007/0244701 A1 | 10/2007 | Erlanger et al. |
| 2007/0274337 A1 | 11/2007 | Purpura |
| 2007/0276851 A1 | 11/2007 | Friedlander et al. |
| 2007/0294111 A1 | 12/2007 | Settimi |
| 2007/0299691 A1 | 12/2007 | Friedlander et al. |
| 2007/0299694 A1 | 12/2007 | Merck |
| 2008/0010254 A1 | 1/2008 | Settimi |
| 2008/0015871 A1 | 1/2008 | Eder |
| 2008/0065576 A1 | 3/2008 | Friedlander et al. |
| 2008/0077463 A1 | 3/2008 | Friedlander et al. |
| 2008/0082356 A1 | 4/2008 | Friedlander et al. |
| 2008/0082374 A1 | 4/2008 | Kennis et al. |
| 2008/0114779 A1 | 5/2008 | Friedlander et al. |
| 2008/0172352 A1 | 7/2008 | Friedlander et al. |
| 2008/0177687 A1 | 7/2008 | Friedlander et al. |
| 2008/0177688 A1 | 7/2008 | Friedlander et al. |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |
| 2008/0208832 A1 | 8/2008 | Friedlander et al. |
| 2008/0208838 A1 | 8/2008 | Friedlander et al. |
| 2008/0208875 A1 | 8/2008 | Friedlander et al. |
| 2008/0208901 A1 | 8/2008 | Friedlander et al. |
| 2008/0208902 A1 | 8/2008 | Friedlander et al. |
| 2008/0208903 A1 | 8/2008 | Friedlander et al. |
| 2008/0208904 A1 | 8/2008 | Friedlander et al. |

(56) References Cited

U.S. PATENT DOCUMENTS

| | | | |
|---|---|---|---|
| 2008/0228747 A1 | 9/2008 | Thrall et al. |
| 2008/0278334 A1 | 11/2008 | Friedlander et al. |
| 2008/0288430 A1 | 11/2008 | Friedlander et al. |
| 2008/0294459 A1 | 11/2008 | Angell et al. |
| 2008/0294692 A1 | 11/2008 | Angell et al. |
| 2008/0311574 A1 | 12/2008 | Manne et al. |
| 2009/0024553 A1 | 1/2009 | Angell et al. |
| 2009/0106179 A1 | 4/2009 | Friedlander et al. |
| 2009/0171889 A1 | 7/2009 | Friedlander et al. |
| 2009/0228299 A1 | 9/2009 | Kangarloo et al. |
| 2009/0265206 A1 | 10/2009 | Friedlander et al. |
| 2009/0287503 A1 | 11/2009 | Angell et al. |
| 2009/0299766 A1 | 12/2009 | Friedlander et al. |
| 2011/0071975 A1 | 3/2011 | Friedlander et al. |
| 2012/0173494 A1 | 7/2012 | Friedlander et al. |

FOREIGN PATENT DOCUMENTS

| | | |
|---|---|---|
| JP | 8316872 | 11/1996 |
| JP | 2002312373 | 4/2001 |
| JP | 2002342484 | 2/2002 |
| WO | 9419571 | 9/1994 |
| WO | 9726718 | 7/1997 |
| WO | 0108077 | 2/2001 |

OTHER PUBLICATIONS

Wang et al., "A Mathematical Approach to Disaster Recovery Planning", Xidian University, National Info Security Engineering and Technology Research Center, Beijing, China, Proceedings of the First International Conference of Semantics, Knowledge, and Grid, SKG 2005, pp. 1-3.

Silver, E.A., "An Overview of Heuristic Solution Methods", The Journal of the Operational Research Society, vol. 55, No. 9, Sep. 2004, pp. 936-956.

Chen et al., "Research on Organization Method of Development Activities for Complicated Product", The 9th International Conference on Computer Supported Cooperative Work in Design Proceedings, vol. 1, May 24-26, 2005, pp. 234-239.

Cao et al., "Research on Resource Scheduling for Development Process of Complicated Product", The 9th International Conference on Computer Supported Cooperative Work in Design Proceedings, vol. 1, May 24-26, 2005, pp. 229-331.

Altmann et al., "Cooperative Software Development: Concepts, Model and Tools", C Doppler Laboratory for Software Engineering, Johannes Kepler University, Linz, 1999, pp. 194-207.

Souder, William E., "Analytical Effectiveness of Mathematical Models for R&D Project Selection", Management Science, Application Series, vol. 19, No. 8, Apr. 1973, pp. 907-923.

Adam et al., "Positive Patient Identification: a Practical Solution to a Challenging Problem", Toward an Electronic Patient '97. Conference and Exposition. Proceedings, Pt. vol. 3, 1997, Abstract Only.

Ahmada et al., An artificial neural network model for generating hydrograph from hydro-meteorological parameters, Department of Civil, Architectural and Environmental Engineering, University of Miami, Mar. 31, 2005.

Beaglehole, R, Men Ageing and Health: Achieving health across the life span, 2nd World Congress on the Ageing Male, World Health Organization, Feb. 2000, pp. 1-63.

Chatfield, "Marketing an HMO by 'Smart' ID Cards with Patient History on an Electronic Medical Record", Proceedings. Toward an Electronic Patient Record '96. Twelfth International Symposium on the Creation of Electronic Health Record System and Global Conference on Patient Cards, Pt. vol. 1, 1996.

D.C. et al., "PathMiner: predicting metabolic pathways by heuristic search" School of Medicine, University of Colorado 2003.

Gabrieli, "Guide for Unique Healthcare Identifier Model", Journal of Clinical Computing, vol. 21, No. 5, 1993, Abstract Only.

Goehring, "Identification of Patients in Medical Databases—Soundex Codes Versus Match Code", Medical Informatics, vol. 10, No. 1, pp. 27-34, Jan.-Mar. 1985, Abstract Only.

Goodwin et al., "Data Mining for Preterm Birth Prediction", pp. 46-51.

Grimson et al., "The SI Challenge in Health Care", Communications of the ACM, vol. 43, No. 6, Jun. 2000, pp. 49-55.

Gro Harlem Brundtland, MD, MPH, "Men Ageing and Health: Achieving Health Across the Life Span", Second World Congress on the Ageing Male, World Health Organization, Geneva, Feb. 2000, pp. 1-63.

Grzymala-Busse, "Knowledge Acquisition Under Uncertainty—a Rough Set Approach", In: Journal of Intelligent and Robotic Systems (1988). Available at Springer.

Hashemi et al., "Development of Group's Signature for Evaluation of Skin Cancer in Mice Cause by Ultraviolet Radiation", Proceedings of the International Conference of Information Technology: Computers and Communications, ITCC 2003, IEEE Computer Society, Washington, DC, USA, Apr. 28-30, 2003, pp. 1-4.

Hoshiai et al., "SION Architecture: Semantic Information-Oriented Network Architecture", Transactions of the Institute of Electronics, Information and Communication Engineers, vol. J84-B, No. 3, pp. 411-424, Mar. 2001, Abstract Only.

Hsinchun, Machine Learning for Information Retrieval: Neural Networks, Symbolic Learning, and Genetic Algorithms, Journal of the American Society for Information Science, Apr. 1995.

Johansson et al., "Visual Analysis Based on Algorithmic Classification", Proceedings of the Seventh International Conference on Information Visualization, London, England, Jul. 16-18, 2003, pp. 1-4.

Karlaftis et al., "Effects of road geometry and traffic volumes on rural roadway accident rates" Accident Analysis and Prevention 34, 357-365 2002.

Kiang, "Extending the Kohonen Self-Organizing Map Networks for Clustering Analysis", Journal, Computational Statistics & Data Analysis, vol. 38, Dec. 2, 2001, pp. 161-180.

"Lab4" web page archived on Jul. 11, 2004 at: http://web.archive.org/web/20040711205854/http://www-users.cs.umn.edy/~mckoskey/CSCI5708_databases/original/lab4.html.

Laura et al., "IBM Federated Database Technology", Mar. 1, 2002. http://www.ibm.com/developerworks/data/library/techarticle/0203haas/0203haas.html.

Lowery et al., "Barriers to Implementing Simulation in Health Care", Proceedings from the 1994 Winter Simulation Conference, pp. 868-875.

Lurie, "The Federation Database Interoperability," Apr. 24, 2003. http://www.ibm.com/developerworks/data/library/techarticle/0304lurie/0304lurie.html.

Polak et al., "Using Automated Analysis of the Resting Twelve-Lead ECG to Identify Patients at Risk of Developing Transient Myocardial Ischaemia—an Application of an Adaptive Logic Network", Physiological Measurement, vol. 18, No. 4, Nov. 1997, Abstract Only.

Plum et al., Novel Thret-Risk Index Using Probabilistic Threat Assesment and Human Reliability Analysis, 2004. http://www.inl.gov/technicapublications/documents/2535260.pdf.

Schadow et al., "Discussion Paper: Privacy-Preserving Distributed Queries for a Clinical Case Research Network," In: IEE Int'l Conference on Data Mining Workshop on Privacy, Security, and Data Mining (2002). Available at: ACM.

Shelfer et al., "Smart Card Evolution", Communications of the ACM, vol. 45, No. 7, Jul. 2002, pp. 83-88, Abstract Only.

Toffoli et al., "Freak Waves: Clues for Prediction in Ship Accidents?", The Internationa Society of Offshore and Polar Engineers 2003.

Wang, "A COBRA-based Object Framework with Patient Identification Translation and Dynamic Linking. Methods for Exchanging Patient Data", Methods of Information in Medicine, vol. 38, No. 1, Mar. 1999, Abstract Only.

Wong et al., "Rule-Based Anomaly Pattern Detection for Detecting Disease Outbreaks," In: AAAI-02 Proceedings (2002) https://www.Aaai.org/Papers/AAAI/2002/AAAI02-034.pdf.

USPTO office action for U.S. Appl. No. 11/516,954 dated Dec. 19, 2008.

USPTO notice of allowance for U.S. Appl. No. 11/516,954 dated Jul. 16, 2009.

USPTO office action for U.S. Appl. No. 11/678,959 dated Feb. 19, 2009.

(56) References Cited

OTHER PUBLICATIONS

USPTO final office action for U.S. Appl. No. 11/678,959 dated Aug. 10, 2009.
USPTO notice of allowance for U.S. Appl. No. 11/678,959 dated Feb. 24, 2010.
USPTO office action for U.S. Appl. No. 11/734,079 dated May 14, 2009.
USPTO final office action for U.S. Appl. No. 11/734,079 dated Sep. 28, 2009.
USPTO notice of allowance for U.S. Appl. No. 11/734,079 dated Dec. 2, 2009.
USPTO office action for U.S. Appl. No. 11/734,098 dated Mar. 2, 2010.
USPTO office action for application 117341538 dated Jul. 22, 2009.
USPTO office action for U.S. Appl. No. 11/542,397 dated Dec. 30, 2009.
USPTO notice of allowance for U.S. Appl. No. 11/542,397 dated May 26, 2010.
USPTO office action for U.S. Appl. No. 11/678,997 dated Apr. 15, 2009.
USPTO final office action for U.S. Appl. No. 11/678,997 dated Oct. 5, 2009.
USPTO notice of allowance for U.S. Appl. No. 11/678,997 dated Apr. 6, 2010.
USPTO final office action for U.S. Appl. No. 11/678,997 dated Sep. 15, 2009.
USPTO office action for U.S. Appl. No. 11/678,997 dated Dec. 21, 2010.
USPTO office action for U.S. Appl. No. 11/678,997 dated Apr. 21, 2010.
USPTO office action for U.S. Appl. No. 11/678,957 dated Nov. 27, 2009.
USPTO final office action for U.S. Appl. No. 11/678,957 dated May 12, 2010.
USPTO office action for U.S. Appl. No. 11/678,976 dated Apr. 15, 2009.
USPTO final office action for U.S. Appl. No. 11/678,976 dated Sep. 14, 2009.
USPTO office action for U.S. Appl. No. 11/678,976 dated Dec. 21, 2009.
USPTO notice of allowance for U.S. Appl. No. 11/678,976 dated Apr. 21, 2010.
USPTO office action for U.S. Appl. No. 11/679,009 dated Apr. 15, 2009.
USPTO final office action for U.S. Appl. No. 11/679,009 dated Sep. 15, 2009.
USPTO office action for U.S. Appl. No. 11/679,009 dated Dec. 21, 2009.
USPTO notice of allowance for U.S. Appl. No. 11/679,009 dated May 19, 2010.
USPTO notice of allowance for U.S. Appl. No. 11/968,233 dated Mar. 24, 2010.
USPTO office action for U.S. Appl. No. 11/864,050 dated Jan. 9, 2009.
USPTO final office action for U.S. Appl. No. 11/864,050 dated Apr. 30, 2009.
USPTO notice of allowance action for U.S. Appl. No. 11/864,050 dated Aug. 31, 2009.
USPTO office action for U.S. Appl. No. 11/863,992 dated Dec. 22, 2008.
USPTO final office action for U.S. Appl. No. 11/863,992 dated Apr. 30, 2009.
USPTO notice of allowance for U.S. Appl. No. 11/863,992 dated Sep. 8, 2009.
USPTO office action for U.S. Appl. No. 11/864,039 dated Jan. 2, 2009.
USPTO final office action for U.S. Appl. No. 11/864,039 dated Apr. 30, 2009.
USPTO notice of allowance for U.S. Appl. No. 11/864,039 dated Sep. 1, 2009.
USPTO office action for U.S. Appl. No. 11/864,002 dated Dec. 22, 2008.
USPTO final office action for U.S. Appl. No. 11/864,002 dated Apr. 17, 2009.
USPTO notice of allowance for U.S. Appl. No. 11/864,002 dated Sep. 11, 2009.
USPTO office action for U.S. Appl. No. 12/130,814 dated Feb. 5, 2010.
USPTO notice of allowance for U.S. Appl. No. 12/130,814 dated Apr. 28, 2010.
USPTO office action for U.S. Appl. No. 12/130,543 dated Feb. 3, 2010.
USPTO notice of allowance for U.S. Appl. No. 12/130,543 dated May 25, 2010.
USPTO office action for U.S. Appl. No. 12/121,947 dated Jun. 12, 2010.
U.S. Appl. No. 11/874,382, filed Oct. 18, 2007, Friedlander et al.
U.S. Appl. No. 12/130,779, filed May 30, 2008, Friedlander et al.
U.S. Appl. No. 12/121,947, filed May 16, 2008, Angell et al.
U.S. Appl. No. 12/135,972, filed Jun. 9, 2008, Angell et al.
U.S. Appl. No. 12/135,960, filed Jun. 9, 2008, Angell et al.
U.S. Appl. No. 12/243,825, filed Oct. 1, 2008, Angell et al.
Luckham et al., "Event Processing Glossary", May 2008, Retrieved Jun. 9, 2008, pp. 1-13, <http://complexevents.com/?p=361>.
"AHRQ Quality Indicators—Patient Safety Indicators—Technical Specifications", Department of Health and Human Services Agency for Healthcare Research and Quality, Version 3.1, Mar. 12, 2007, pp. 1-107, <http://www.qualityindicators.ahrq.gov>.
USPTO notice of allowance for U.S. Appl. No. 11/741,538 dated Mar. 29, 2009.
USPTO notice of allowance for U.S. Appl. No. 11/741,538 dated Dec. 22, 2009.
USPTO office action for U.S. Appl. No. 11/741,467 dated Aug. 6, 2009.
USPTO final office action for U.S. Appl. No. 11/741,467 dated Dec. 21, 2009.
Haas et al., "IBM Federated Database Technology", IBM Developer Library, Mar. 2002, 13 pages, accessed Apr. 13, 2010, http://www.ibm.com/developerworks/data/library/techarticle/0203haas/0203haas.html.
Han et al., "Discovery of Multiple-Level Association Rules from Large Databases," In: Proceedings of the 21st VLDB Conference, pp. 420-432, Zurich, Switzerland, Sep. 11-15, 1995.
Harackiewicz et al., "Short-Term and Long-Term Consequences of Achievement Goals: Predicting Interest and Performance Over Time," Journal of Educational Psychology, 92(2):316-330, 2000.
Hirose et al., "Corpus-Based Synthesis of Mandarin Speech with F0 Contours Generated by Superposing Tone Components on Rule-Generated Phrase Components," In: Spoken Language Technology Workshop, Goa, Japan, Dec. 15-19, 2008, pp. 33-36. (Abstract only).
Kim, "Development of the IT Convergence Using Power Line Communication," In: Computer and Information Science (CIS), IEEE/ACIS 9th International Conference on Digital Object Identifier, Yagamata, S. Korea, Aug. 18-20, 2010, pp. 696-701. (Abstract only).
Lee et al., "SAVE: A Framework for Semantic Annotation of Visual Events," In: Computer Vision and Pattern Recognition Workshops, CVPRW '08, IEEE Computer Society Conference on Digital Object Identifier, Anchorage, Alaska, Jun. 23-28, 2008, pp. 1-8.
McShan et al., "PathMiner: predicting metabolic pathways by heuristic search," Bioinformatics, Oxford University Press, vol. 19, Issue 13, Sep. 2003, pp. 1692-1698.
Soffer et al., "Information Retrieval Based on Touch-Tone® Encoded Alphanumeric Keys," Software Engineering, IEEE Transactions on SE-3 (2):184-189, Mar. 1977. (Abstract only).
Tracy et al., "An Agent-Based Approach to Inference Prevention in Distributed Database Systems," In: Proceedings of the 14th IEEE International Conference on Tools with Artificial Intelligence, Washington, D.C., Nov. 4-6, 2002, pp. 413-422.
Wang et al., "A New Approach for Real-Time Detection of Abandoned and Stolen Objects," In: Electrical and Control Engineering (ICECE), 2010 International Conference, Wuhan, China, Jun. 25-27, 2010, pp. 128-121. (Abstract only).

(56) References Cited

OTHER PUBLICATIONS

Xing et al., "Bayesian Multi-Population Haplotype Inference via a Hierarchical Dirichlet Process Mixture," In: Proceedings of the 23rd International Conference on Machine Learning, Pittsburgh, Pennsylvania, Jun. 25-29, 2006, pp. 1049-1056.
USPTO Office Action regarding U.S. Appl. No. 11/553,526, dated Dec. 15, 2008, 15 pages.
USPTO Notice of Allowance regarding U.S. Appl. No. 11/553,526, dated Apr. 23, 2009, 10 pages.
USPTO Office Action regarding U.S. Appl. No. 11/678,957, dated Sep. 15, 2010, 31 pages.
USPTO Notice of Allowance regarding U.S. Appl. No. 11/678,957, dated Feb. 18, 2011, 18 pages.
USPTO Notice of Allowance regarding U.S. Appl. No. 11/734,098, dated Aug. 9, 2010, 10 pages.
USPTO Notice of Allowance regarding U.S. Appl. No. 11/741,467, dated Nov. 19, 2010, 24 pages.
USPTO Office Action regarding U.S. Appl. No. 11/874,382, dated Mar. 25, 2010, 22 pages.
USPTO Final Office Action regarding U.S. Appl. No. 11/874,382, dated Aug. 16, 2010, 24 pages.
USPTO Notice of Allowance regarding U.S. Appl. No. 11/874,382, dated Dec. 14, 2010, 16 pages.
USPTO Final Office Office Action regarding U.S. Appl. No. 12/121,947, dated Nov. 22, 2010, 24 pages.
USPTO Office Action regarding U.S. Appl. No. 12/130,779, dated Mar. 23, 2011, 38 pages.
USPTO Final Office Action regarding U.S. Appl. No. 12/130,779, dated Aug. 11, 2011, 16 pages.
USPTO Office Action regarding U.S. Appl. No. 12/135,960, dated Oct. 28, 2010, 33 pages.
USPTO Final Office Action regarding U.S. Appl. No. 12/135,960, dated Apr. 18, 2011, 13 pages.
USPTO Office Action regarding U.S. Appl. No. 12/135,972, dated Jul. 28, 2011, 38 pages.
USPTO Notice of Allowance regarding Application No. 12/135,972, dated Nov. 17, 2011, 5 pages.
USPTO Office Action regarding U.S. Appl. No. 13/044,074, dated Oct. 14, 2011, 9 pages.
USPTO Notice of Allowance regarding U.S. Appl. No. 12/243,825, dated Jul. 20, 2011, 33 pages.
USPTO Office Action regarding U.S. Appl. No. 12/911,391, dated Mar. 31, 2011, 35 pages.
USPTO Notice of Allowance regarding U.S. Appl. No. 12/911,391, dated Jul. 5, 2011, 25 pages.
USPTO Notice of Allowance regarding U.S. Appl. No. 12/911,391, dated Oct. 26, 2011, 19 pages.
USPTO Notice of Allowance regarding U.S. Appl. No. 13/044,074, dated Apr. 16, 2012, 7 pages.
USPTO Notice of Allowance regarding U.S. Appl. No. 13/044,074, dated Aug. 7, 2012, 53 pages.
USPTO Office Action regarding U.S. Appl. No. 12/135,960, dated Sep. 22, 2014, 25 pages.
Office action dated Dec. 17, 2014, regarding U.S. Appl. No. 12/121,947, 24 pages.
Final office action dated Dec. 18, 2014, regarding U.S. Appl. No. 12/135,960, 10 pages.
Final Office Action dated May 21, 2015, regarding U.S. Appl. No. 12/121,947, 11 pages.
Office Action, dated Sep. 24, 2015, regarding U.S. Appl. No. 12/130,779, 25 pages.
Office Action dated Sep. 23, 2015, regarding U.S. Appl. No. 12/121,947, 12 pages.

* cited by examiner

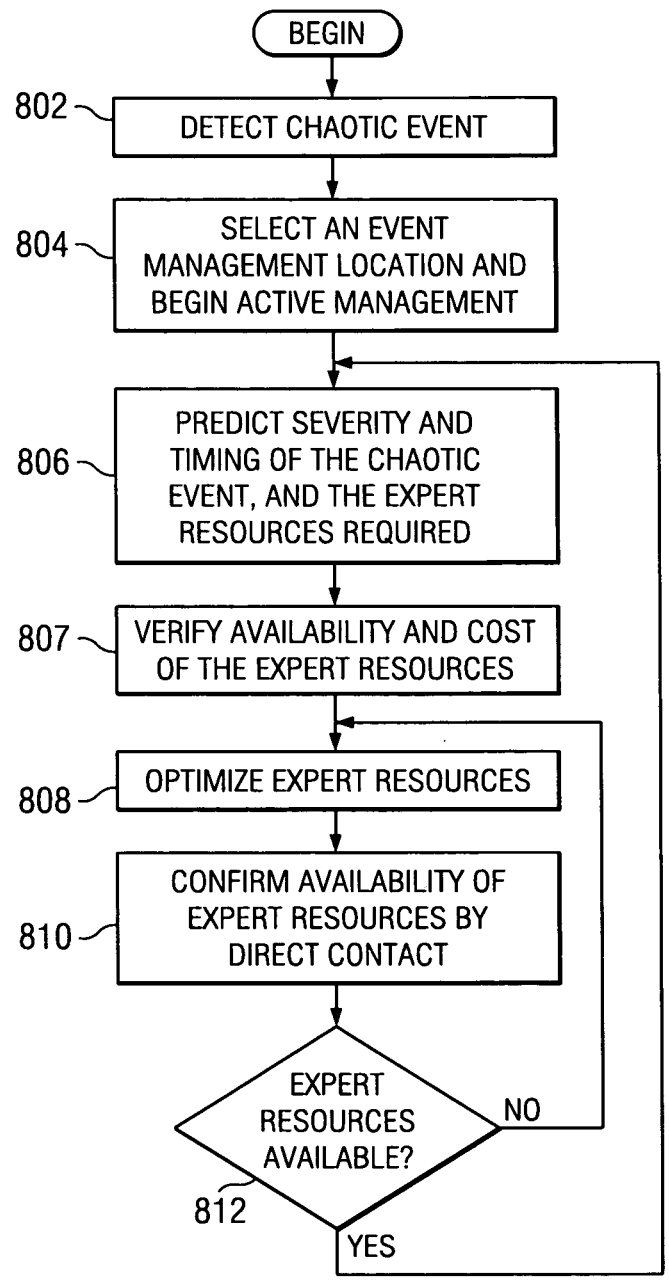

OPTIMIZING THE SELECTION, VERIFICATION, AND DEPLOYMENT OF EXPERT RESOURCES IN A TIME OF CHAOS

BACKGROUND OF THE INVENTION

1. Field of the Invention

The present invention relates generally to an improved data processing system. More particularly, the present invention relates to a computer implemented method, apparatus, and computer usable program code for finding expert services in times of chaos.

2. Description of the Related Art

Major chaotic events are, by definition, times of great difficulty. Chaotic events are events that cause an interruption in routines normally performed by people in everyday activities because of damage inflicted to individuals and infrastructure. For example, there is great potential for episodes of profound chaos during hurricanes, earthquakes, tidal waves, solar flares, flooding, terrorism, war, and pandemics to name a few. Even when the chaotic event is statistically predictable, the results are often still shocking. Chaotic events do not occur frequently, but the results may be long lasting and unexpected.

Human beings, by nature, are generally very ill prepared at a mental level for planning for and dealing with these chaotic events. Leaders and other planners tend to only concentrate on a small number of obvious situations. Additionally, various chaotic events are difficult to plan for because of how rarely they occur and because of the unknowable. The unknowable effects may include the severity and geographic range of the affected area and the reaction to the event. Plans often have political or economic groundings rather than being empirically driven.

Further complicating chaotic events are the disruption to the lives of staff members, leaders of organizations, and individuals that may be expected to provide support, services, or leadership during and after the chaotic event. Unfortunately, during chaotic events, the people most needed may have been killed, injured, assisting family members, fleeing, or otherwise inaccessible. Standard contingency planning, especially for expert support, is necessary but insufficient because chaotic events are rare, catastrophic, and dynamic in nature.

The exact skills and quantities of each skill needed are unknowable. The availability of the necessary skill pool is problematic because trying to lock in additional skills in advance of a chaotic event is financially and organizationally infeasible. Providing the logistics necessary in advance to provide expert support for all potentially catastrophes is impossible. As a result, people, corporations, governments, enterprises, and agencies have great difficulty in finding necessary expert skills during chaotic events.

SUMMARY OF THE INVENTION

The illustrative embodiments provide a computer implemented method, apparatus, and computer usable program code for finding skills and resources for a chaotic event. Skills data for the chaotic event are organized. A determination is made whether the skills and the resources are available in response to a receiving an identification of the skills and the resources that are required to manage the chaotic event. The skills and the resources are optimized based on requirements and constraints, potential skills, and enabling resources to determine optimized skills and optimized resources. The availability of the optimized skills and the optimized resources are verified. The optimized skills and the optimized resources are reoptimized in response to a determination that the optimized skills and the optimized resources are unavailable.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 8 is a flowchart for managing expert resources during times of chaos in accordance with the illustrative embodiments.

DETAILED DESCRIPTION OF THE PREFERRED EMBODIMENT

Figure 1:
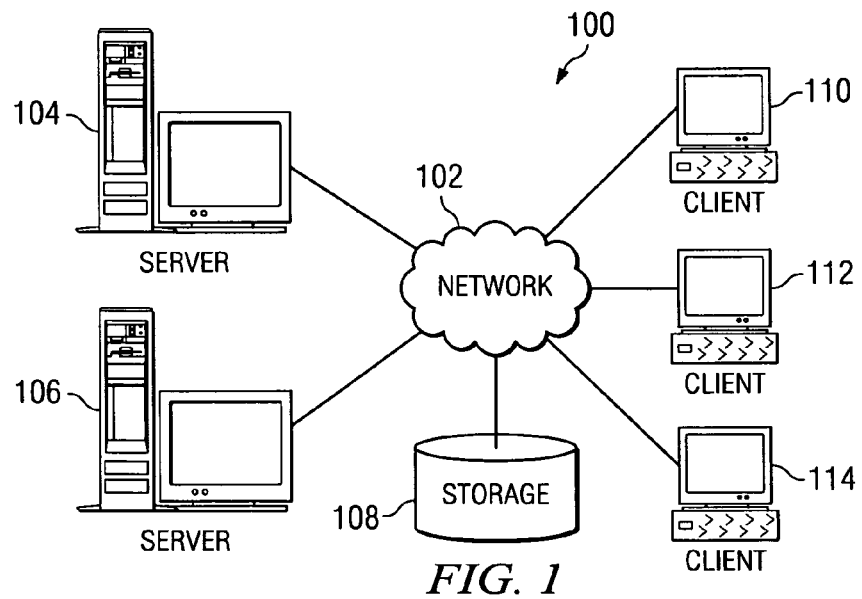
FIG. 1 is a pictorial representation of a data processing system in which the illustrative embodiments may be implemented.
Figure 2:
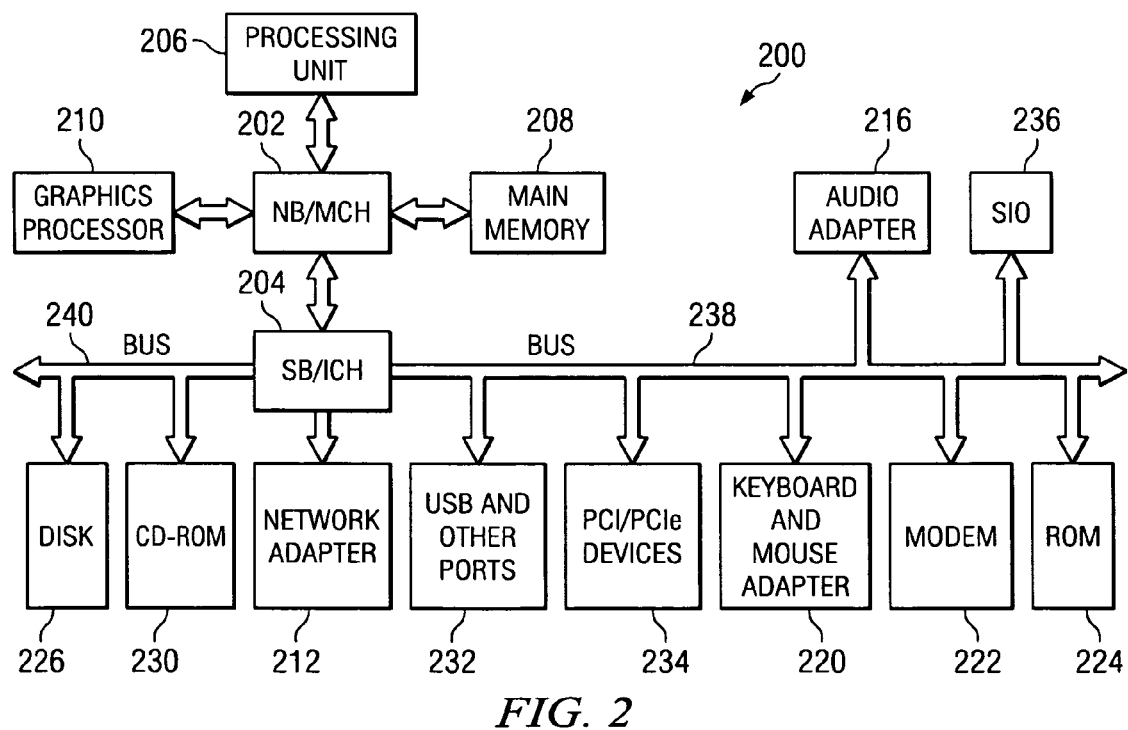
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for finding expert skills during times of chaos. A chaotic event is detected automatically or manually based on received information. The process of the illustrative embodiments is initiated in response to the detection of a potentially chaotic event. In general terms, management of the event begins from a single point or multiple points, based on the detection of a potentially chaotic situation. A determination is made as to what the required resources are for the situation.

Resources or expert resources are skills, expert skills, and resources required by individuals with skills to deal with the chaotic event. Resources include each expert individual with the necessary skills as well as transportation, communications, and materials to properly perform the task required by the expertise or skill of the individual. For example, heavy equipment operators may be needed as well as doctors. Heavy equipment operators may need bulldozers, backhoes, and transportation to the event location, and the doctors may require nurses, drugs, a sterile room, a communications center, emergency helicopters, and operating instruments.

The needed skills are optimized based on requirements and constraints for expert services, a potential skills pool, cohorts of a related set of skills, and enabling resources. Optimization is the process of finding a solution that is the best fit based on the available resources and specified constraints. The solution is skills and resources that are available and is recognized as the best solution among numerous alternatives because of the constraints, requirements, and other circumstances and criteria of the chaotic event. A cohort or unified group may be considered an entity rather than a group of individual skills, such as a fully functioning mobile army surgical hospital (MASH) unit.

The service requirements are transmitted to the management location for reconciliation of needed skills against available skills. Skills requirements and individuals and cohorts available for deployment are selected based on optimization of costs, time of arrival, utility value, capacity of transportation route, and value. Routes are how the resource is delivered. For example, in some cases, a route is an airplane. In another example, a route is a high-speed data line that allows a surgeon to remotely view an image. The process is continuously monitored and optimized based on feedback and changing situations. The execution of the plan is implemented iteratively to provide the necessary expert resources. The expert resources are deployed by decision makers to manage the chaotic event by effectively handling the circumstances, dangers, events, and problems caused by the chaotic event.

Figure 3:
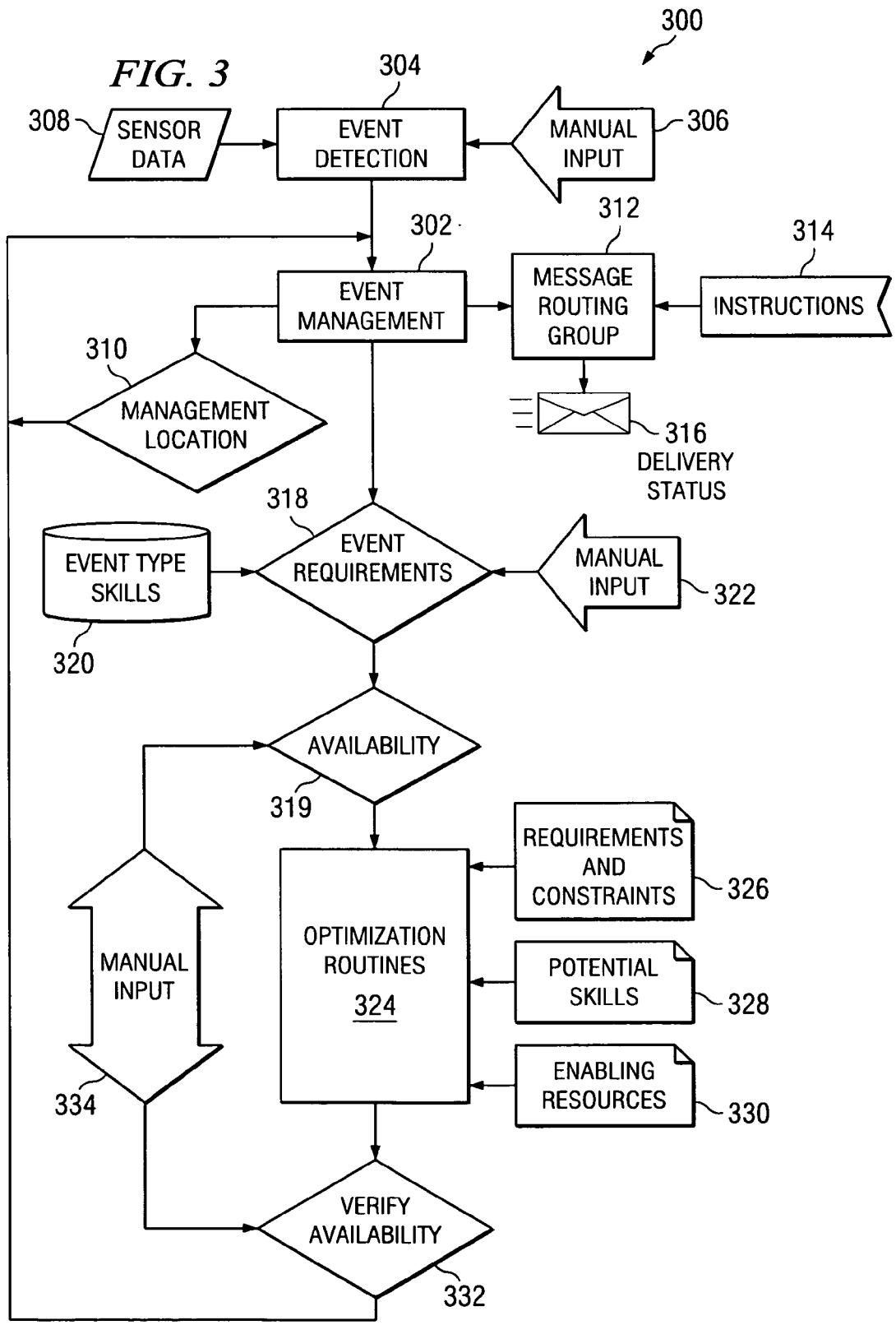
FIG. 3 is a block diagram for managing chaotic events in accordance with the illustrative embodiments.

FIG. 3 is a block diagram for managing chaotic events in accordance with the illustrative embodiments. Event management system 300 is a collection or network of computer programs, software components or modules, data processing systems, devices, and inputs used to manage expert skills for a chaotic event. Event management system 300 includes all steps, decisions, and information that may be needed to deal with a chaotic event. Event management system 300 may be a centralized computer program executed and accessible from a server, such as server 104 of FIG. 1 or a network of hardware and software components, such as network data processing system 200 of FIG. 2.

Event management system 300 or portions of event management system 300 may be stored in a databases or data structures, such as storage 108 of FIG. 1. Event management system 300 may be accessed in person or by using a network, such as network 102 of FIG. 1. Event management system 300 may be accessed by one or more users, decision makers, or event managers for managing the chaotic event. The user may enter information and receive information through an interface of event management system 300. The information may be displayed to the user in text and graphics. Additionally, the user may be prompted to enter information and decisions to help the user walk through the management of the chaotic event. For example, event management system 300 may walk a state governor through each step that should be taken for a sun flare that has crippled the state in a logical and effective sequence.

Event management system 300 is used for information processing so that decisions may be more easily made based on incoming information that is both automatically sent and manually input. Event management system 300 enables administrators, leaders, and other decision makers to make decisions in a structured and supported framework. In some cases, leaders may be so unprepared or shocked by the chaotic event that event management system 300 may walk leaders through necessary steps. In this manner, event management system 300 helps the leaders to take effective action quickly. Event management system 300 intelligently interacts with decision makers providing a dynamic interface for prioritizing steps and a work flow for dealing with the chaotic event in a structured framework. The decisions may be based on policy and politics in addition to logistical information.

Event management system 300 is managed by event management 302. Event management 302 begins the process of managing a chaotic event in response to event detection 304 detecting the event. For example, if the chaotic event is a series of catastrophic tornadoes, event detection 304 may become aware of the tornadoes through the national weather service. Alternatively, storm chasers may witness the series of tornadoes and report the event in the form of manual input 306 to event detection 304. Event detection 304 may also be informed of the chaotic event by sensor data 308. Sensor data is information from any number of sensors for detecting chaotic events including sensors for detecting wind, rain, seismic activity, radiation, and so forth. Event detection 304 informs event management 302 of the chaotic event occurrence and known details of severity so that preliminary estimates may be made. Event detection 304 is further described in FIG. 4, and predicting severity of chaotic events is further described in FIG. 5 below.

Once event detection 304 has informed event management 302 of the location and occurrence of a chaotic event, event management 302 works with management location 310 to determine a suitable location for management of the event. Event detection 304 sends a message to event management 302. The message may specify any ascertained information, such as the time, focal point, geographic area, and severity of the chaotic event if known. For example, if event management 302 is located on server 104 of FIG. 1 that has been flooded by torrential rains in Georgia, event management 302 may be transferred to server 106 of FIG. 1, located in Texas. Management location 310 allows the process of event management 302 to occur from the best possible location. Event management 302 may occur from multiple event management positions if there are multiple chaotic events simultaneously.

For example, the best possible location may be an external location out of the danger zone or affected area. Alternatively, the best possible location may be the location closest to the affected area that still has access to power, water, communications, and other similar utilities. Management location 310 may maintain a heartbeat connection with a set of one or more event management positions for immediately transferring control to a specified event management component if the heartbeat connection is lost from an event management component in the affected area. The heartbeat signal should be an encrypted signal.

A heartbeat connect is a periodic message or signal informing other locations, components, modules, or people of the status of event management 302. In another example, the chaotic event may be a federal disaster. A local management location 310 may transfer control of event management 302 to the headquarters of the supervising federal agency, such as Homeland Security or the Federal Aviation Administration (FAA). If event management 302 is damaged or inaccessible, a redundant or alternative event management location automatically takes control. Additionally, event management 302 may systematically make decisions regarding event management or transfer management location 310 to a different location if event management 302 does not receive instructions or feedback from decision makers or other individuals involved in management of the chaotic event.

For example, if a mayor providing user input and information from event management 302 becomes unavailable, decisions regarding management may be made based on the best available information and alternatives. Additionally, management location 310 may be transferred to a location where individuals are able and willing to provide user input and receive information from event management 302.

In some cases, such as a large chemical release, leaders for corporations, organizations, and government entities may not have direct access to event management 302. As a result, message routing group 312 may be used to communicate instructions 314 for the effective management of the chaotic event. Message routing group 312 is the hardware and software system used to communicate instructions 314 from event management 302. Instructions 314 may include directions, instructions, and orders for managing the response and other event-specific information.

Message routing group 312 may keep track of whether instructions 314 have been received by the intended party through the tracking of delivery status 316. Delivery status 316 indicates status information, such as if, when, how the message in instructions 314 was delivered, and descriptions of any problems preventing delivery.

Event management 302 passes information about the event to event requirements 318. For example, event management 302 may pass information regarding the severity of the chaotic event gleaned from manual input 306 and sensor data 308 to event requirements 318. Event requirements 318 determine which skills, resources, or other information is required for the chaotic event. Event requirements 318 determine whether required skills and resources may be provided in person or remotely. For example, welders and trauma doctors may be required to be in person, but a pathologist may work via remote microscope cameras and a high-speed data connection.

Event requirements 318 may be updated by event management 302 as more information becomes available about the chaotic event. Event requirements 318 may use event type skills 320 to determine the skills needed based on the type of chaotic event. Event type skills 320 is a collection of resources needed for each event type. For example, if a hurricane has damaged water-retaining facilities, such as reservoirs, levees, and canals, more civil engineers than normal may be required for the hurricane. Event type skills 320 is preferably a database of skills stored in a database or memory, such as main memory 208 of FIG. 2 required for all possible chaotic events. For example, event type skills 320 may specify the skills needed for a meltdown of a nuclear reactor including welders, waste disposal experts, nuclear engineers, paramedics, doctors, nuclear researchers, and so forth.

Event requirements 318 may also receive information regarding required skills in the form of manual input 322. Manual input 322 may be received from authorized individuals close to the chaotic event, experts in the field, or based on other in-field or remote observations.

Information from event requirements 318 is passed to availability 319. Availability 319 performs a preliminary determination of the skills and resources to determine available skills and resources. For example, experts with required skills may be called, emailed, or otherwise contacted to determine whether the expert is available, and if so, for how long and under what conditions or constraints. Individuals or organizations with manage, access, control, or possess resources are contacted to determine whether the resources may be used. Availability 319 may also rank potential skills and resources based on location, availability, proximity, cost, experience, and other relevant factors. Availability information is passed from availability 319 to optimization routines 324.

Optimization routines 324 uses information from availability 319, requirements and constraints 326, potential skills 328, and enabling resources 330 to iteratively make suggestions regarding optimal skills and resources. Iterations are based particularly on event severity and event type. For example, optimization routines 324 may be used once every six minutes at the onset of a chaotic event whereas after three months, the iterations may be updated once a day. Only skills and resources that may be available are considered by optimization routines 324. Optimal skills and resources are derived based on elapsed time to arrive on-scene, proximity, capacity, importance, cost, time, and value. For example, optimal location for skills may be preferentially ordered by skill type and value or estimated time of arrival to the scene of the chaotic event.

Optimization routines 324 is a process for maximizing an objective function by systematically choosing the values of real or integer variables from within an allowed set. The values used by optimization routines are values assigned to each skill, resource, route, and other factors that relate to delivery of the required skills and resources.

In one example, optimization routines 324 may be described in the following way:

Given: a function f: A→ R from some set A

Sought: an element $x_0$ such that $f(x_0) \geq f(x)$ for all x in A

Typically, A is some subset of the Euclidean space $R^n$, often specified by a set of constraints, equalities or inequalities that the members of A have to satisfy. For example, constraints may include capacity, time, and value. For example, the capacity of a truck and a helicopter are different as are a dial-up Internet connection and a cable Internet connection.

The elements of A are called feasible solutions. The function f, that is maximized, is called an objective function or cost function. A feasible solution that maximizes the objective function is called an optimal solution and is the output of optimization routines 324 in the form of optimized skills and resources. Optimal skills and resources are the resources that are the best solution to a problem based on constraints and requirements. For example, the problem or skill to be optimized may be that event managers need a doctor with a specialty in radiation sickness with three or more years experience in or around Texas with transportation to Dallas, Tex. that is available for the next two weeks. The optimal solution in this case may be a doctor that lives in Northern Dallas with the required experience and availability. The optimal solution for skills and resources is also optimized based on cost. If a bulldozer may be moved from two locations with similar restraints, the optimal solution is the cheapest solution. In other words, all other constraints being met, a lower cost resource is preferably to a higher cost resource. Aspects of optimization routines 324 are further described in FIG. 6 for finding and organizing skills.

Requirements and constraints 326 specify the requirements and constraints for expert services. Requirements and constraints 326 may be established by local and federal law, organizational ethics, or other societal norms and policies. Similarly, requirements and constraints 326 may be adjusted by persons in authority based on the needs and urgency of those needs. For example, during a biological disaster, there may be a requirement that only individuals immunized for small pox be allowed to provide services. Additionally, requirements and constraints 326 may initially suggest that only medical doctors with three or more years of practice will be beneficial for the chaotic event. Requirements and constraints 326 may be adjusted as needed, removed, or replaced with a new looser restraint. Decision makers should be informed about the binding constraints, such as license required.

Requirements and constraints 326 may be dynamically adjusted based on conditions of the disaster. For example, if there is an extreme outbreak of small pox, constraints and requirements 326 may specify that any doctor immunized for smallpox, regardless of experience, would be useful for dealing with the small pox outbreak. Requirements and constraints 326 may be specified by governmental, public health, or business requirements.

Potential skills 328 specify the potential expert skills of individuals that may be available. Potential skills 328 may be generated based on commercial or governmental databases, job sites, research and papers, public licenses, or using a web crawler. For example, OmniFind produced by International Business Machines Corporation.

Enabling resources 330 are the resources that enable qualified experts to perform the required tasks. Enabling resources 330 may be manually generated by experts in each field or may be automatically generated based on past events. Enabling resources 330 may be stored in a database or storage, such as 108 of FIG. 1. For example, if a bomb has partially destroyed a building, a structural engineer may require the use of a concrete X-ray machine to properly perform the tasks that may be required. In another example, a heart surgeon may instruct a general surgeon how to perform specialized procedures using high resolution web-cameras. As a result, enabling resources 330 needs to have access to a data connection, including landlines or wireless communications at a specified bandwidth, and cameras, as well as a sterile location, medical equipment, and personnel to perform the procedure. In yet another example, doctors remotely servicing the outbreak of a virus may require email access to digital pictures taken by medical technicians in the area of the chaotic event.

Optimization routines 324 computes the optimum mix of skills and resources. The answer will consist of the person and/or resources, transportation routes to the disaster site, time of availability, and the shadow price of substituting an alternate resource. Optimization routines 324 specifies alternatives in case an optimum skill and resource is unavailable. As a result, the next most optimal skill and resource may be quickly contacted until the necessary skills and resources are found to manage the chaotic event.

Availability 319 and verify availability 332 determines which experts and resources are available automatically or based on manual input 334. In these examples, manual input 334 may be received as each individual or group responsible for the expert or resource is contacted and terms of availability are checked. Manual inputs 306, 322, and 334 may be submitted via phone, email, or other voice, text, or data recognition system. Alternatively, availability 319 and verify availability 332 may use an automatic message system to contact each expert to determine availability. For example, using pre-collected email addresses for the experts, an automated messaging system may request availability information from experts with the desired skill set. For example, the Centers for Disease Control (CDC) may have a database of experts specifying personal information, for example, addresses, contact information, and inoculation history that may be used to contact required experts and professionals.

Verify availability 332 determines whether the optimized skills and resources are available. Verify availability 332 confirms that the skills and resources selected by event management 302 to manage the chaotic event will in fact be available and may be relied on. For example, a surgical team that is selected by optimization routines 324 as the best fit for a earthquake trauma team may need to be called on the phone to confirm that the surgical team may be flown to the earthquake site in exactly twenty four hours. Once verify availability 332 has determined which experts and resources are available, that information is passed to event management 302.

The process for updating event requirements 318, availability 319, optimization routines 324, and verify availability 332 are repeated iteratively based on information regarding the chaotic event. For example, after an earthquake affecting the San Francisco area, event requirements 318 may be updated every eight hours for two months until all of the required needs and skills have been acquired.

Figure 4:
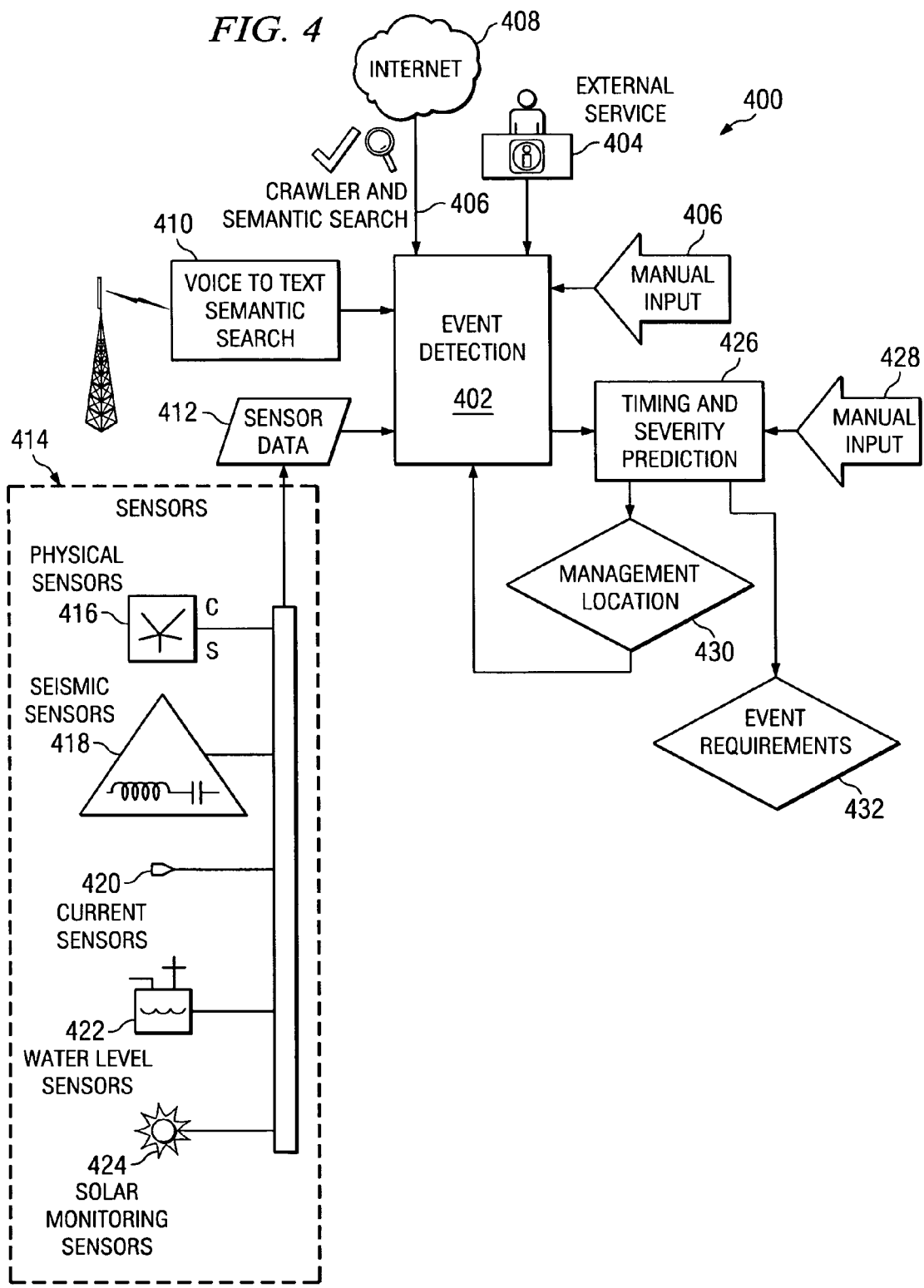
FIG. 4 is a block diagram for detecting chaotic events in accordance with the illustrative embodiments.

FIG. 4 is a block diagram for detecting chaotic events in accordance with the illustrative embodiments. Event detection system 400 may be implemented in an event detection component, such as event detection 304 of FIG. 3. Alternatively, event detection system 400 may be part of an event management module, such as event management 302 of FIG. 3. Event detection system 400 is the system used to detect a potentially chaotic event. Event detection system 400 may determine whether an event is real, and if so, whether the event is significant. For example, an undersea earthquake may or may not be a chaotic event based on location, size of the earthquake, and the potential for a tsunami.

Event detection 402 functions using various techniques and processes to detect a potentially chaotic event. Event detection 402 may become aware of the chaotic event through external service 404. External service 404 may be a government, business, or other organizational monitoring service. For example, external service 404 may include the National Transportation Board, National Weather Service, National Hurricane Service, news wire services, Lloyds of London for loss of ships, the Bloomberg service, or Guy Carpenter insurance database, and other commercial information brokers.

Event detection 402 may also receive manual input 406, such as manual input 306 of FIG. 3 as previously described. Manual input 406 may also be used to verify whether a chaotic event has actually occurred. Crawler and semantic search 406 may be used to access Internet 408. Crawler and semantic search 406 is a web crawler that searches publicly available portions of the Internet for keywords or other indications that a chaotic event has, is, or will occur. A web crawler is a program which browses Internet 408 in a methodical, automated manner. For example, the web crawler may note email traffic, news stores, and other forms of data mining. False alarms are filtered out with heuristic rules and man-in-the-loop functions.

Similarly, voice to text semantic search 410 may be used to identify that a chaotic event has taken place. Voice to text semantic search 410 may use voice to text translations or voice recognition technologies to recognize phrases, keywords, or other indicators of a chaotic event. For example, transmissions across emergency broadcast channels or to emergency services may be analyzed by voice to text semantic search to identify that a reservoir has broken.

Event detection 402 may also receive input from sensor data 412. Sensor data 412 is data, such as sensor data 308 of FIG. 3. Sensor data 412 may be received from sensors 414 which may include physical sensors 416, such as sensors that monitor gaps in bridges, seismic sensors 418 for monitoring seismic activity, current sensors 420 such as current sensors in utility lines for detecting electromagnetic pulses, water level sensors 422, and solar monitoring sensors 424 for indicating solar activity. Sensors 414 are used to automatically pass sensor data 412 indicating a chaotic event to event detection 402. Sensors 414 may also include monitors to indicate total loss of communications via internet or telephone to a given area, absolute volumes coming out of a particular area, spikes or communications jams, failures of cell phone towers, and other occurrences that indicate a chaotic event may have occurred.

Event detection 402 outputs the event detection to timing and severity prediction 426. Timing and severity prediction 426 indicates the known timing and severity of the chaotic event or a predicted time and severity if the chaotic event is anticipated. Timing and severity prediction 426 may receive information via manual input 428. For example, a scientist measuring seismic activity may send data and visual information regarding the eruption of a volcano to indicate the severity of the event. Timing and severity prediction 426 passes the information regarding time and severity to management location 430. Management location 430 is a location management module, such as management location 310 of FIG. 3.

Timing and severity prediction 426 passes information about the chaotic event to event requirements 432. Timing and severity prediction 426 predicts the severity of the chaotic event in addition to what skills and resources may be needed as well as the quantities of skills and resources. Event requirements 432 is an event specific module, such as event requirements 318 of FIG. 3. For example, if an unusually powerful solar flare is expected, communications and satellite coordinators and experts may be required to prevent effects of the solar flare or to recover from the effects after the event.

Figure 5:
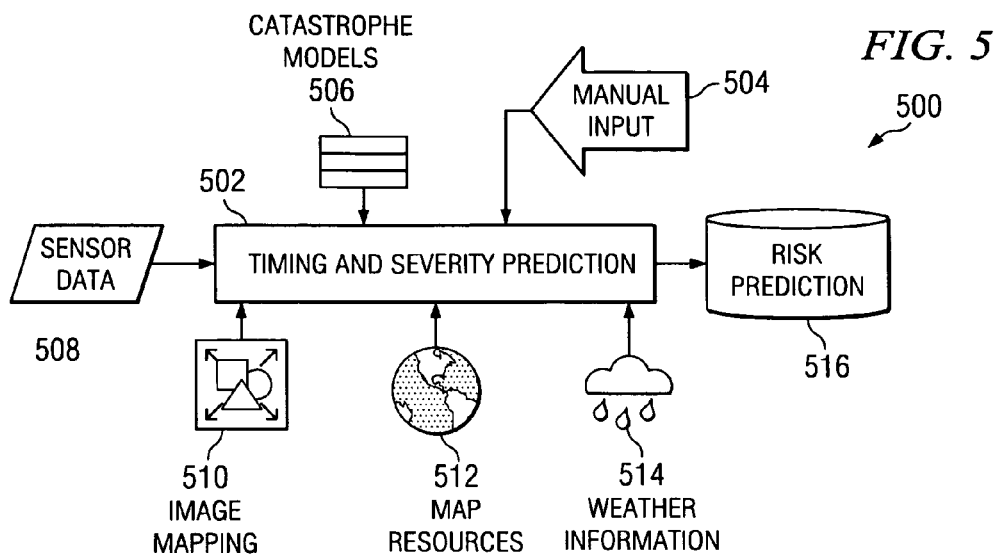
FIG. 5 is a block diagram for predicting severity of chaotic events in accordance with the illustrative embodiments.

FIG. 5 is a block diagram for predicting severity of chaotic events in accordance with the illustrative embodiments. Timing and severity prediction system 500 is a more detailed description of timing and severity prediction 426 of FIG. 4. As previously described, timing and severity prediction 502 receives manual input 504.

Timing and severity prediction 502 receives information from catastrophe models 506. Catastrophe models 506 are models of each possible chaotic event by region and the resulting affects and consequences of the chaotic event. Catastrophe models 506 are preferably created by scientists and other experts before the occurrence of the chaotic event. For example, catastrophe models 506 may model the effects of a category five hurricane striking South Carolina.

Sensor data 508 is data, such as sensor data 308 of FIG. 3. Additional information resources including, for example, image mapping 510, map resources 512 and weather information 514 may be used by timing and severity prediction 502 to determine the severity of the chaotic event. For example, image mapping 510 may show the impact crater of a meteor. Map resources 512 may be used to determine the number of buildings destroyed by a tornado. Weather information 514 may be used to show whether a hurricane is ongoing or whether recovery efforts may begin. Weather information 514 includes forecast models rather than raw data.

Timing and severity prediction 502 uses all available information to make risk prediction 516. Risk prediction 516 specifies the risks associated with the chaotic event. For example, risk prediction 516 may predict the dangers of a magnitude 7.4 earthquake in St. Louis before or after the earthquake has occurred.

Figure 6:
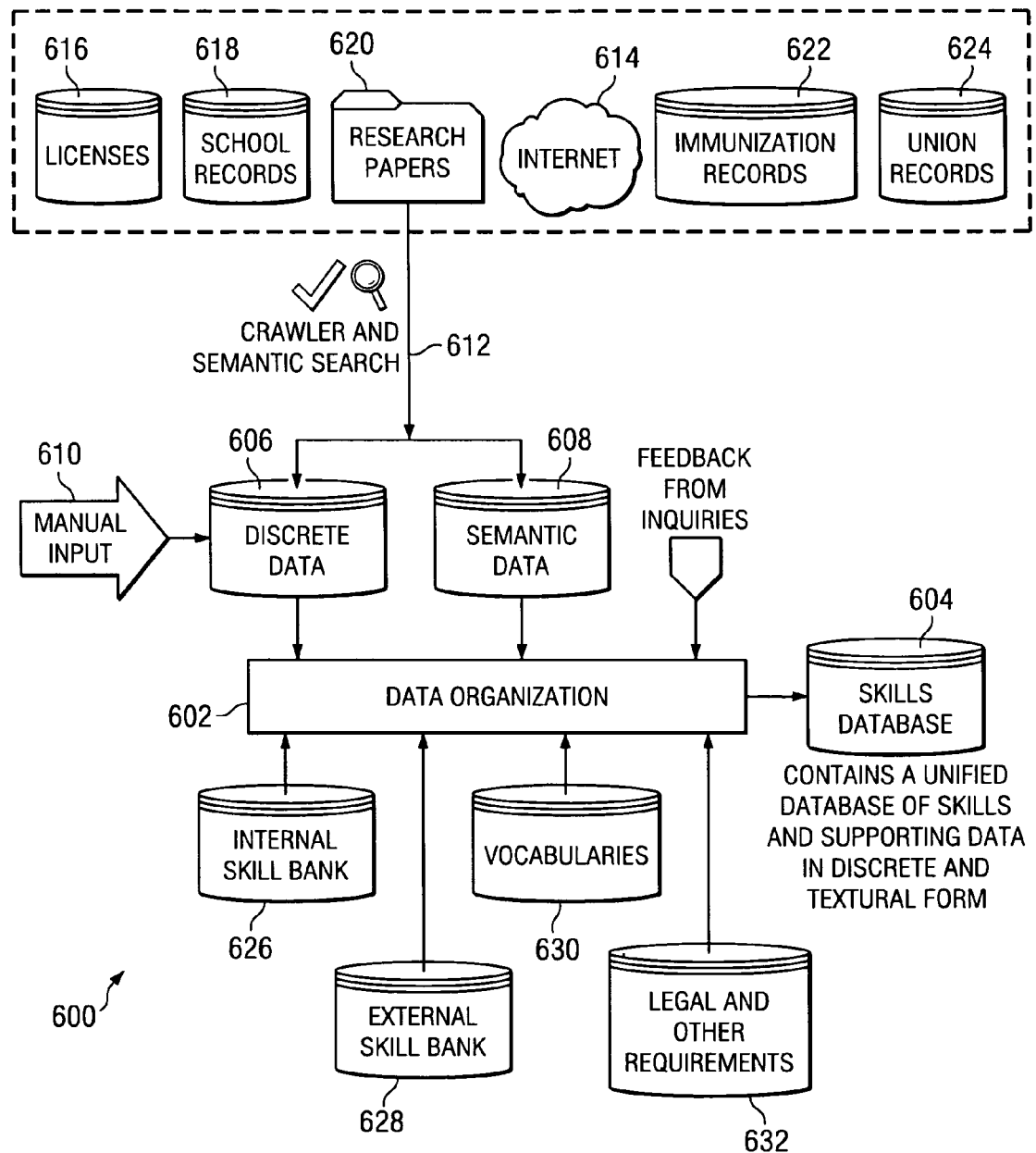
FIG. 6 is a block diagram for finding and organizing skills for chaotic events in accordance with the illustrative embodiments.

FIG. 6 is a block diagram for finding and organizing skills for chaotic events in accordance with the illustrative embodiments. Organization system 600 is a system that helps find expert skills or potentially available skills. Data is collected and organized by data organization 602 to populate skills database 604. Skills database 604 is a unified database of skills and supporting data in discrete and textual form. For example, skills database 604 may be implemented in event type skills 320 of FIG. 3. The data organized by data organization 602 may be physically instantiated or federated. In other words, the data may be actually copied into a database used by data organization 602 or accessed through a query through a federated database. Federated databases may allow access to data that is not easily transferred but provides useful information.

Data organization 602 organizes data from any number of sources as herein described. Data is received from discrete data 606 and semantic data 608. Discrete data 606 is something that may be entered in a database, such as numbers or specific words. Semantic data has to be read in context. A pathology report may be broken up into discrete data 606 including temperature, alive or dead. Manual input 610 may be communicated to discrete data 606. Data organization 602 may use queries for discrete and semantic data to find necessary information.

Web crawler and semantic search referred to as crawler and semantic search 612 may be used to gather data from any number of sources on Internet 614 that are publicly available. Crawler and semantic search 612 may be, Webfountain, produced by International Business Machines Corporation or other similar products. For example, crawler and semantic search 612 may search licenses 616, school records 618, research papers 620, immunization records 622, organizational records, and union records 624. For example, crawler and semantic search 612 may discover a large number of doctors that have graduated from medical school but do not have licenses in the state where the chaotic event occurred.

Data organization 602 may further access internal skill bank 626, external skill bank 628, vocabularies 630, and legal and other requirements 632. Internal skill bank 626 is a skill bank maintained by data organization 602 in the event of a chaotic event. External skill bank 628 may be a skill bank maintained by an outside organization or individual. External skill bank 628 may be intended for emergency situations or may simply be a skill bank for organizing relevant skill sets in other business, government, or miscellaneous settings.

Feedback from inquiries 634 specifies whether an individual is available and that another individual should be considered. For example, a drilling engineer may disclose unavailability to assist with a mine collapse.

Figure 7:
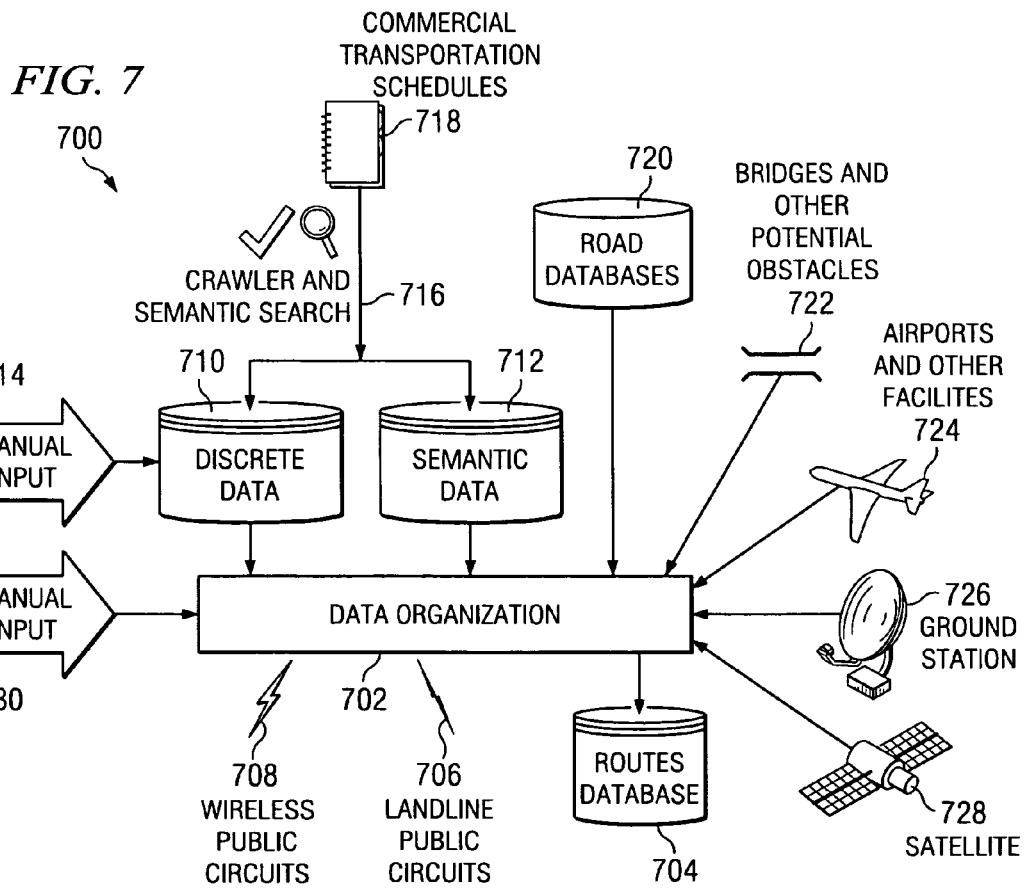
FIG. 7 is a block diagram for finding and organizing routes for chaotic events in accordance with the illustrative embodiments.

FIG. 7 is a block diagram for finding and organizing routes for chaotic events in accordance with the illustrative embodiments. Route system 700 may be implemented in optimization routine modules, such as optimization routines 324 of FIG. 3. Route system 700 is used to optimize available skills and resources based on distance, traveling time, capacity of a route, cost, and value as prioritized by decision makers from event management 302 of FIG. 3. Route system 700 performs optimizations based on questions which may include how far away the skills or resources are, how long the skills or resources take to get to the necessary location, and what the capacity is. For example, a truck may have a high capacity to move a team of surgeons if a road is available, but may take eight hours to get to a desired location. A helicopter may be used to quickly move a nuclear engineer regardless of road conditions. Route system 700 may be used to perform optimizations based on event requirements 318 of FIG. 3.

Data organization 702 organizes information from various resources, and that information is passed to routes database 704. Routes database 704 is a unified database of physical and electronic routes including distances and capacity for expert skills and resources and limiting constraints. Constraints for routes may include availability, volume, cost, capacity, bytes, flights per hour, and trucks per day. Routes database 704 may be used by availability components, such as availability 332 of FIG. 3 to determine whether expert skills and resources are feasibly accessible by a route either physically or electronically even if they are available.

Data organization 702 receives information from landline public circuits 706. Landline public circuits 706 may include communications lines, such as telephones, fiber-optics, data lines, and other physical means for transporting data and information. Data organization 702 also receives information from wireless public circuits 708 which may include wireless access points, cell phone communications, and other publicly available wireless networks.

Data is received from discrete data 710 and semantic data 712. Manual input 714 may be communicated to discrete data 710. Crawler and semantic search 716 may be used to gather data from any number of sources. For example, crawler and semantic search 716 may search commercial transportation schedules 718 to find tractor trailers, busses, airlines, trains, boats, and other means of commercially available means of transporting people and resources.

Data organization 702 may receive information from road databases 720 for determining which roads may be used to access the geographic region of the chaotic event. Road databases 720 may also specify which roads are accessible after the chaotic event. For example, after an earthquake in Salt Lake City, Interstate 15 may not be available because of overpass collapses.

Data organization 702 may also receive information from bridges and other potential obstacles 722. Airports and other facilities 724 may provide additional information regarding airports and other similar facilities including status and capacity, such as train stations, docks, and other transportation hubs. For example, a data network may be available but only with low bandwidth access.

Data organization 702 also receives information from ground station 726. Ground station 726 is a station located on the earth that is used for transmitting information to or receiving information from satellite 728 or other earth orbiting communication devices. For example, information regarding ground station 726 and satellite 728 may specify capacity, capability, data rates, and availability. Ground station 726 and satellite 728 may be used by individuals with expert skills or resources to coordinate the response to the chaotic event. For example, in the event that medical images need to be sent from rural Idaho to New York City, ground station 726 and satellite 728 may need to have available bandwidth. Data organization 702 may also receive information in the form of manual input 730.

FIG. 8 is a flowchart for managing expert resources during times of chaos in accordance with the illustrative embodiments. The process of FIG. 8 may be implemented by an event management system, such as event management system 300 of FIG. 3. In one example, the process of FIG. 8 is implemented by a program application that systematically walks one or more decision makers through the steps and decisions that need to occur to effectively manage the chaotic event. The program application systematically helps the decision make, develop, and implement a strategy for the chaotic event in a logical sequence based on predefined steps and priorities.

The process of FIG. 8 begins by detecting a chaotic event (step 802). The event may be detected by a module, such as event detection 304 of FIG. 3 and event detection system 400 of FIG. 4.

Next, the process selects an event management location and begins active management (step 804). Step 804 may be performed by a module, such as event management 302 of FIG. 3. The determination regarding event management location may be made based on feedback from a module, such as management location 310 of FIG. 3. Active management in step 804 may involve managing the situation by deploying personnel with expert skills and resources and coordinating relevant communication and recovery efforts.

Next, the process predicts severity and timing of the chaotic event, and the expert resources required (step 806). Step 806 may be implemented by a module, such as event requirements 318 of FIG. 3 and timing and severity prediction system 500 of FIG. 5. If the chaotic event is particularly severe, additional expert skills and resources may be required. Expert skills may be further determined using a module, such as organization system 600 of FIG. 6. For example, if a tsunami occurs off the western coast of the United States, a large number of doctors and water contamination specialists may be required.

Next, the process verifies the availability and cost of the expert resources (step 807). The process of step 807 may be implemented by a module, such as availability 319 of FIG. 3. Step 807 ensures that only potentially available resources are examined to save time, effort, and processing power.

Next, the process optimizes the expert resources (step 808). The process of step 808 may be performed by optimization routines, such as optimization routines 324 of FIG. 3. The expert resources may be optimized based on factors, such as requirements and constraints 326, potential skills 328, and enabling resources 330 of FIG. 3.

Next, the process confirms the availability of the expert resources by direct contact (step 810). The process of step 810 may be implemented by a module, such as verify availability 332 of FIG. 3. Availability may be based on the schedule, time, and commitments of individual experts or groups of experts. Availability may also be determined based on routes for communicating and transporting skills and resources based on a system, such as route system 700 of FIG. 7.

Next, the process determines whether the expert resources are available (step 812). The determination of step 812 may be based on transportation, cost, proximity, schedule, and time. For example, if the cost of flying a surgeon from Alaska to New York is impractical, the process may need to reoptimize the expert resources. If the expert resources are available, the process returns to step 806. The process of steps 806-812 is repeated iteratively to optimize and re-optimize the active management of the response to the chaotic event in step 804.

As a result, the management of the chaotic event is dynamic and adapts to changing circumstances. For example, if flooding from a hurricane washes out roads that were previously used to access staging areas, new routes for medical personnel and supplies needs to be determined in a step, such as step 810. In addition, water contamination experts and water testing equipment may be required in greater numbers for a category five hurricane than for a category two hurricane.

If the process determines the expert sources are not available in step 812, the process optimizes expert resources (step 808). In other words, optimized expert resources are further reoptimized based on confirmed availability in step 812. As a result, the decision makers or event managers may deploy the most appropriate resources to effectively manage each aspect of the chaotic event.

Thus, the illustrative embodiments provide a system, method and computer usable program code for finding expert services during a chaotic event. By detecting chaotic events as soon as possible and identifying the type of chaotic event, effective management of expert skills and resources may be quickly and efficiently managed. Information regarding potentially available skills and resources are used to determine how the chaotic event may be dealt with. By effectively optimizing expert skills and available routes based on availability, severity of the chaotic event, and other resulting factors, lives may be saved, and recovery efforts and the appropriate response may begin more effectively. The illustrative embodiments allow the best skills and resources available to be more easily found for addressing each aspect or problem caused by the chaotic event.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for finding skills and resources for managing a chaotic event using an Internet, the computer implemented method comprising:
    finding, by a computer, skills data corresponding to the skills for managing the chaotic event using a web crawler to search the Internet;
    organizing, by the computer, the skills data corresponding to the skills for managing the chaotic event in a network storage;
    detecting, by the computer, an occurrence of the chaotic event using the web crawler and a number of sensors;
    selecting, by the computer using a management location module, a plurality of event management positions to manage the chaotic event;
    responsive to the computer receiving an identification of the skills and the resources required to manage the chaotic event, predicting, by the computer, timing and severity of the chaotic event using sensor data from the number of sensors to determine the skills and the resources and quantities of the skills and the resources required to manage the chaotic event;
    optimizing, by the computer, the skills and the resources based on requirements and constraints, potential skills, and enabling resources to form optimized skills and optimized resources;
    confirming, by the computer, availability of personnel having the optimized skills and the optimized resources using an automated messaging system to verify that the optimized skills and optimized resources selected by the optimizing remain available;
    communicating, by the computer, instructions to available personnel having the optimized skills required to manage the chaotic event using the automated messaging system;
    maintaining, by the computer, a heartbeat connection using an encrypted heartbeat signal with a plurality of chaotic event management modules located at the selected plurality of event management positions to transfer control to a specified chaotic event management module in response to the heartbeat connection being lost from a chaotic event management module located in an event management position affected by the chaotic event; and
    responsive to the computer determining that the optimized skills and the optimized resources are unavailable, reoptimizing, by the computer, the optimized skills and the optimized resources.

2. A computer program product for finding skills and resources for managing a chaotic event using an Internet, the computer program product comprising a non-transitory computer readable storage medium having program instructions embodied therewith, the program instructions executable by a computer to cause the computer to:
    find, by the computer, skills data corresponding to the skills for managing the chaotic event using a web crawler to search the Internet;
    organize, by the computer, the skills data corresponding to the skills for managing the chaotic event in a network storage;
    detect, by the computer, an occurrence of the chaotic event using the web crawler and a number of sensors;
    select, by the computer using a management location module, a plurality of event management positions to manage the chaotic event;
    predict, by the computer, timing and severity of the chaotic event using sensor data from the number of sensors to determine the skills and the resources and quantities of the skills and the resources required to manage the chaotic event in response to the computer receiving an identification of the skills and the resources required to manage the chaotic event;
    optimize, by the computer, the skills and the resources based on requirements and constraints, potential skills, and enabling resources to form optimized skills and optimized resources;
    confirm, by the computer, availability of personnel having the optimized skills and the optimized resources using an automated messaging system to verify that the optimized skills and optimized resources selected by the optimizing remain available;
    communicate, by the computer, instructions to available personnel having the optimized skills required to manage the chaotic event using the automated messaging system;
    maintain, by the computer, a heartbeat connection using an encrypted heartbeat signal with a plurality of chaotic event management modules located at the selected plurality of event management positions to transfer control to a specified chaotic event management module in response to the heartbeat connection being lost from a chaotic event management module located in an event management position affected by the chaotic event; and reoptimize, by the computer, the optimized skills and the optimized resources in response to determining that the optimized skills and the optimized resources are unavailable.

3. A computer for finding skills and resources for managing a chaotic event using an Internet, the computer comprising:

a bus system;

a memory connected to the bus system, wherein the memory stores program instructions; and a processing unit connected to the bus system, wherein the processing unit executes the program instructions to:

find skills data corresponding to the skills for managing the chaotic event using a web crawler to search the Internet;

organize the skills data corresponding to the skills for managing the chaotic event in a network storage;

detect an occurrence of the chaotic event using the web crawler and a number of sensors;

select, using a management location module, a plurality of event management positions to manage the chaotic event;

predict timing and severity of the chaotic event using sensor data from the number of sensors to determine the skills and the resources and quantities of the skills and the resources required to manage the chaotic event in response to receiving an identification of the skills and the resources required to manage the chaotic event;

optimize the skills and the resources based on requirements and constraints, potential skills, and enabling resources to form optimized skills and optimized resources;

confirm availability of personnel having the optimized skills and the optimized resources using an automated messaging system to verify that the optimized skills and optimized resources selected by the optimizing remain available;

communicate instructions to available personnel having the optimized skills required to manage the chaotic event using the automated messaging system;

maintain a heartbeat connection using an encrypted heartbeat signal with a plurality of chaotic event management modules located at the selected plurality of event management positions to transfer control to a specified chaotic event management module in response to the heartbeat connection being lost from a chaotic event management module located in an event management position affected by the chaotic event; and reoptimize the optimized skills and the optimized resources in response to determining that the optimized skills and the optimized resources are unavailable.

* * * * *